Oct. 3, 1972   J. S. BROWN   3,695,895
MOLDING MACHINE WITH SPRAY DEFROST
Filed Oct. 29, 1970   5 Sheets-Sheet 1
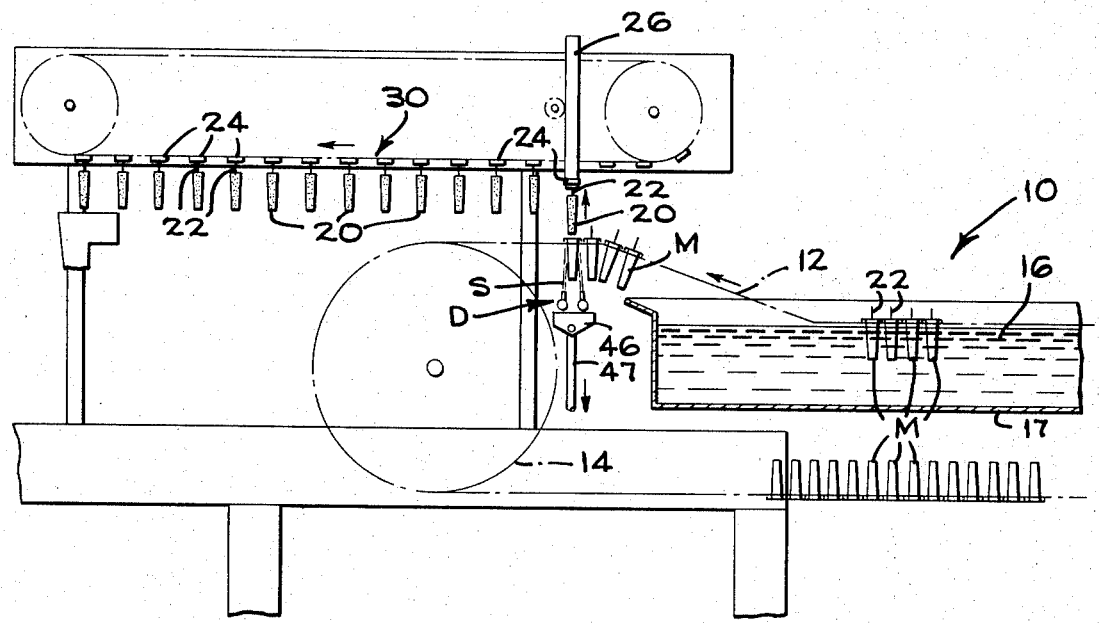
FIG_1
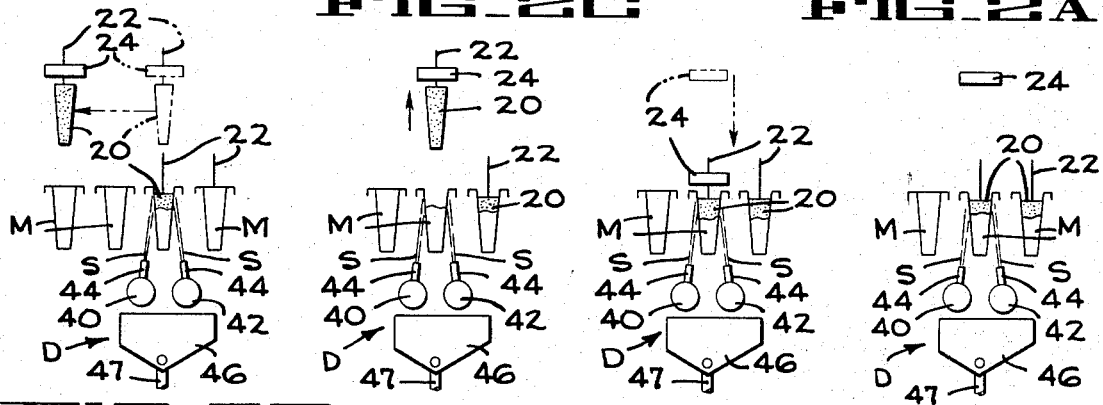
FIG_2C   FIG_2A
FIG_2D   FIG_2B
INVENTOR.
JOHN S. BROWN
BY F. W. Anderson
C. E. Tripp
ATTORNEYS

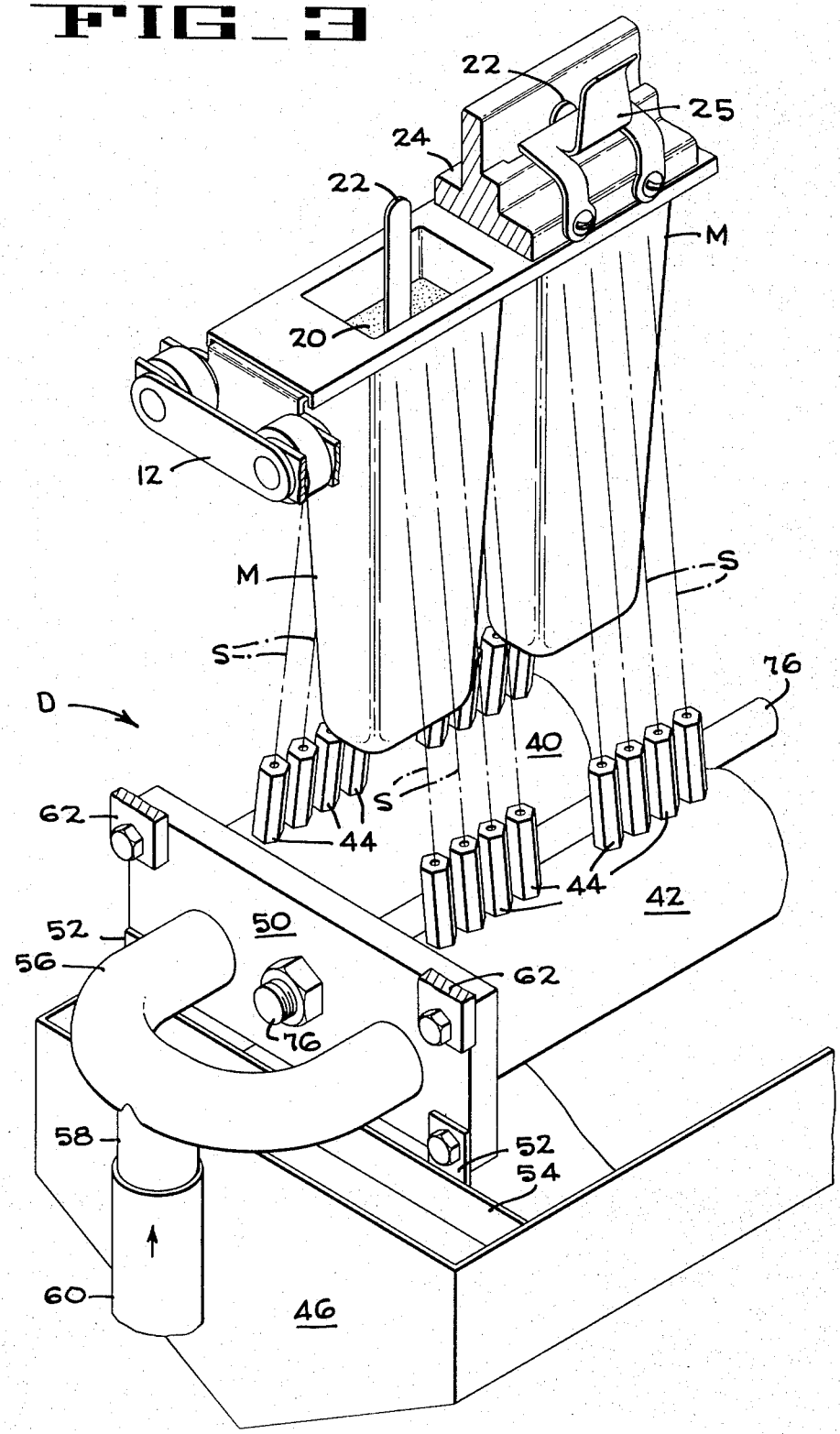

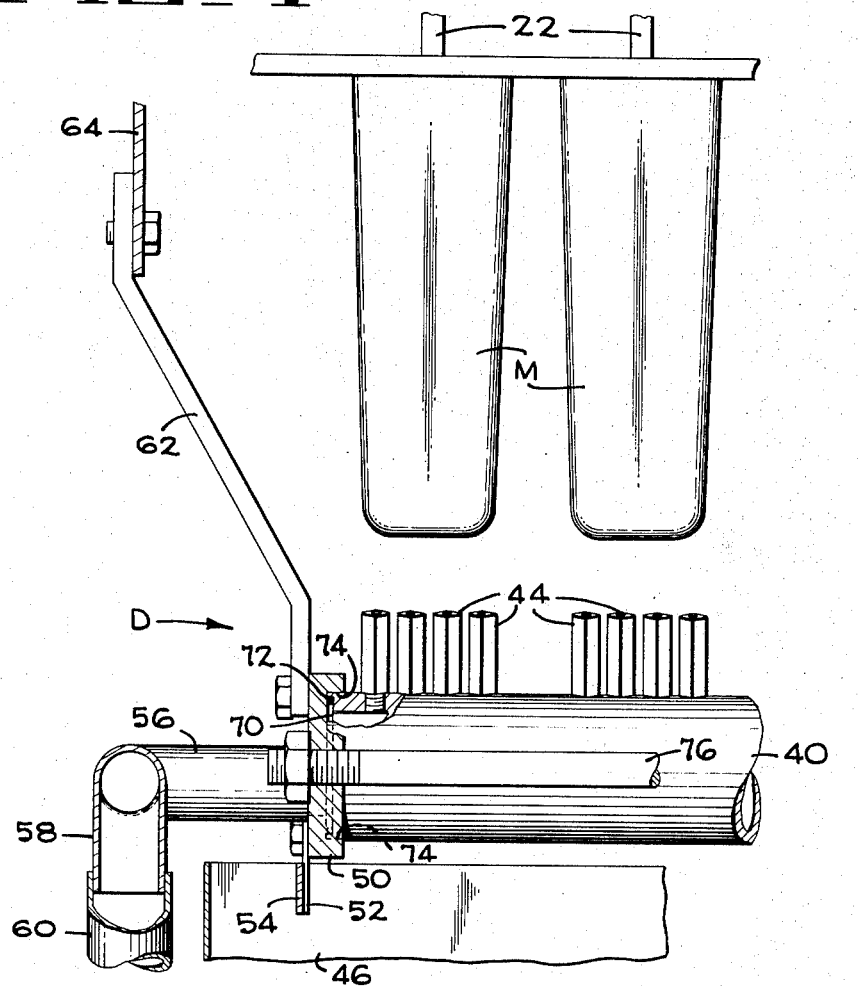
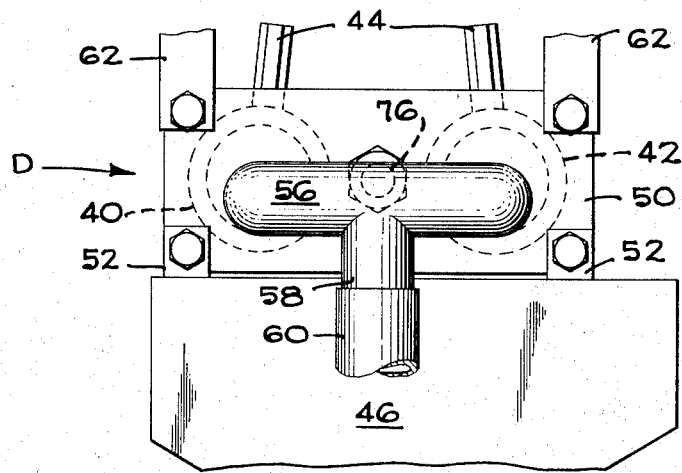

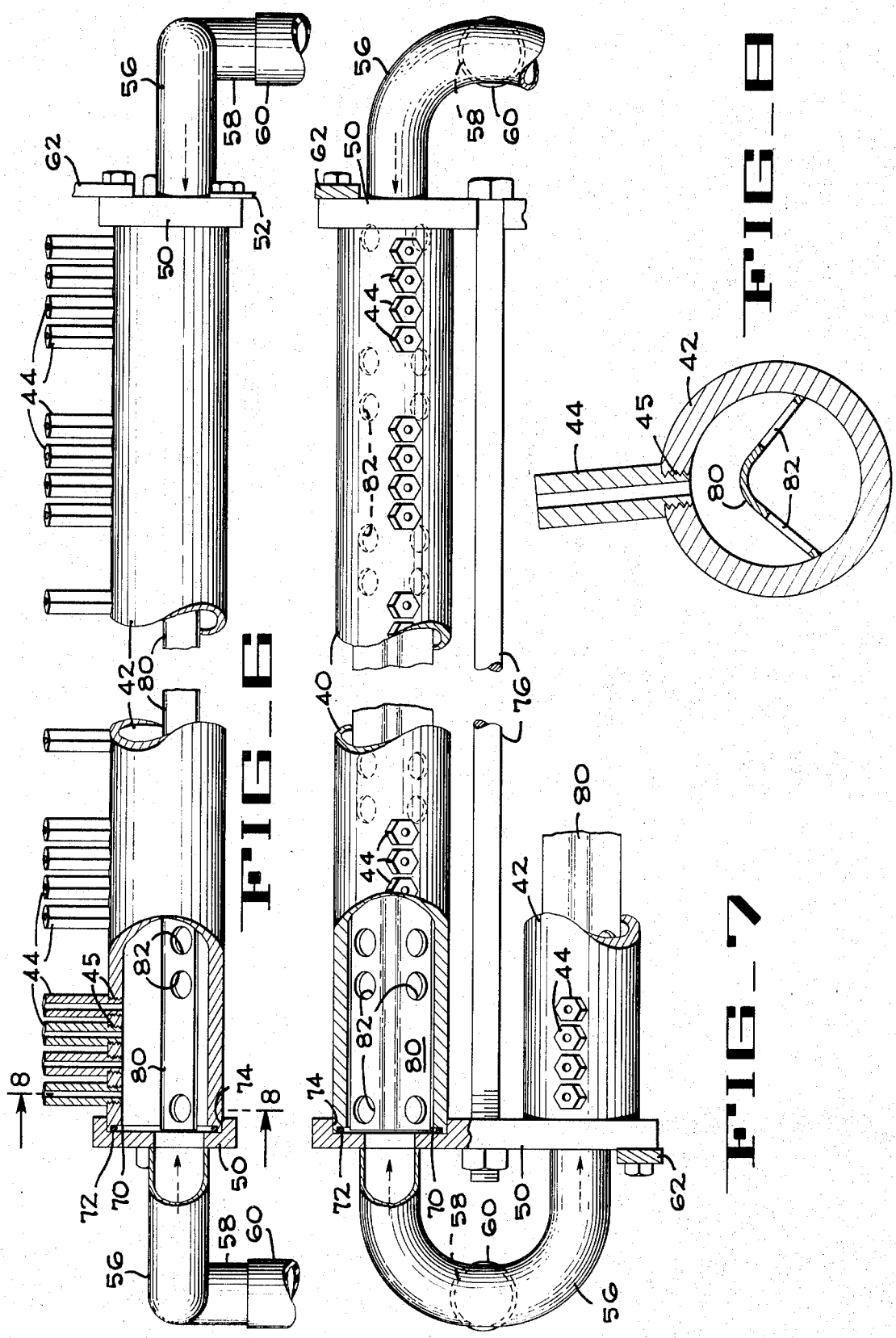

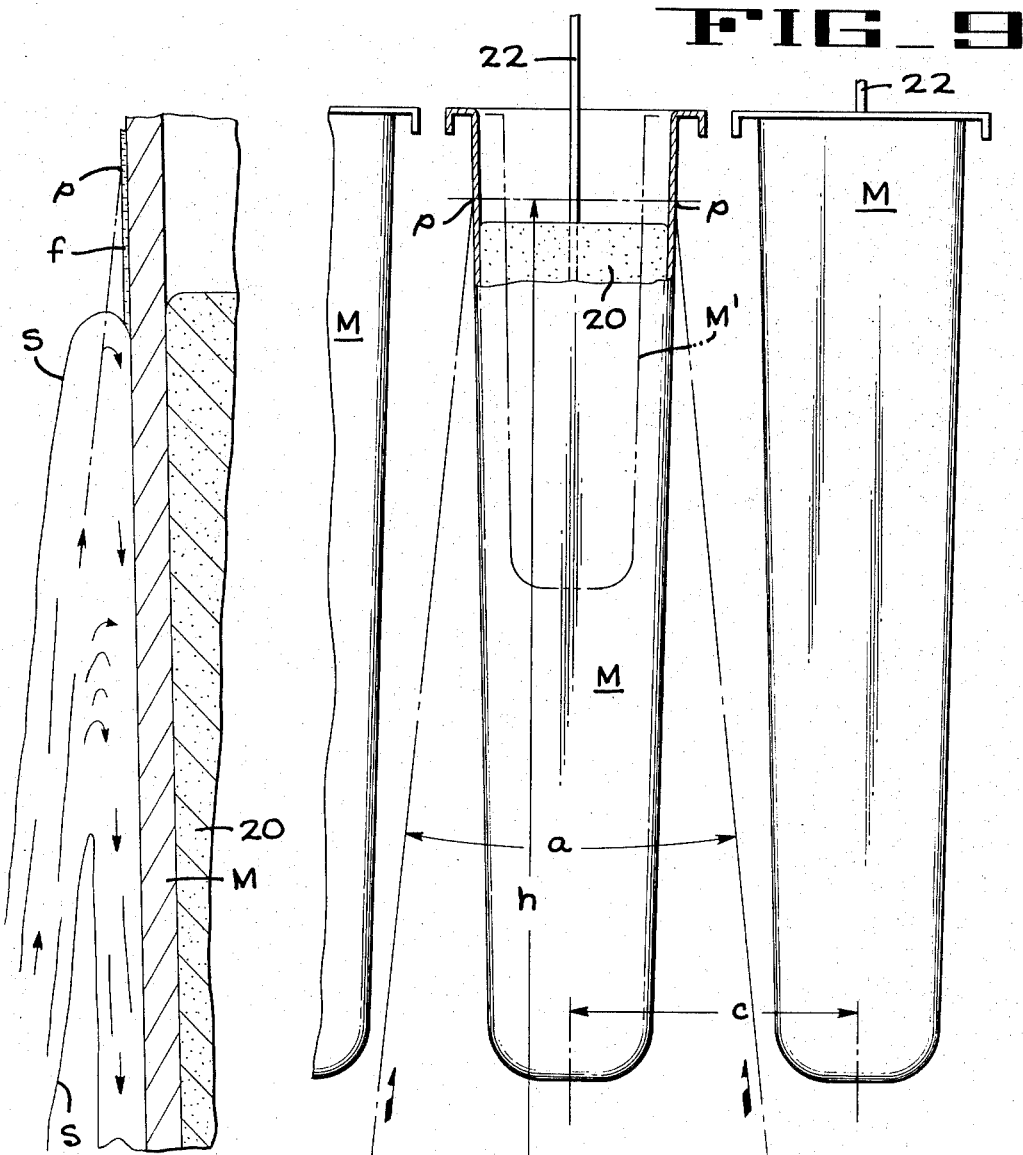
FIG_9
FIG_10

United States Patent Office 3,695,895
Patented Oct. 3, 1972

3,695,895
MOLDING MACHINE WITH SPRAY DEFROST
John S. Brown, Sacramento, Calif., assignor to FMC Corporation, San Jose, Calif.
Filed Oct. 29, 1970, Ser. No. 85,004
Int. Cl. F25c 7/04
U.S. Cl. 99—136
11 Claims

ABSTRACT OF THE DISCLOSURE

In a frozen food molding machine, molds are lifted from an immersion freezing tank and advanced to a position above parallel headers which straddle the molds. Streams of heated water are continuously converged against the pre-wetted sides of said molds by nozzles projecting up from the headers. The angularity of nozzle convergence is adjustable, and baffles extend inside the nozzle headers.

BACKGROUND OF THE INVENTION

Field of the invention

This invention relates to freeze molding and more particularly to freeze molding and extraction of the frozen food products or the like from their molds.

Description of the prior art

The U.S. patent to Curti 3,535,889, Oct. 27, 1970, discloses a rotating freezing machine wherein the molds are defrosted from a single row of spray pipes below the molds.

The U.S. patent to Zarotschenzeff et al. 2,247,865, July 1, 1941 shows defrosting of closed top molds by spray pipes above the molds.

The U.S. patent to Wagner 2,685,177, Aug. 3, 1954, shows fluid sprays on rotating bottles as well as dribbling a form of coolant down along the sides of the bottles.

The U.S. patent to Heise, 2,614,403, Oct. 21, 1952, shows the use of upwardly directing fluid sprays for freezing products in molds.

SUMMARY OF THE INVENTION

The present invention relates specifically to the extraction of frozen products from their molds, in conjunction with food molding and freezing machines such as those of United States Hirahara et al., Pat. No. 3,403,639, issued Oct. 1, 1968, assigned to the FMC Corporation, and the patents mentioned therein.

Prior commercial machines in this field have defrosted or thawed the molds for extraction of the frozen products therefrom by indexing a long chain mold conveyor, causing a defrost pot or tank to be brought up around a transverse row of molds, while stationary, until the heated water in the defrost tank breaks the bond between the frozen product and the mold walls, and extracting of the frozen product. This has utilized what might be termed a "three cycle machine," the three cycles being first, indexing of the molds; second, application of the extractor bars to the stationary molds coupled with the defrost pot application to the molds referred to above; and third, extraction of the released product from the molds by lifting the extractor bars coupled with withdrawal of the defrost pot from the molds.

Thus prior commercial machines of the above type required mechanism for raising and lowering a long, transverse defrost tank and its liquid, as well as for circulating water through the tank to maintain the necessary heat sink and temperature differential. In addition to the cost and complexity of this construction, the indexing rate of the mold conveyor was limited to about 18 strokes/minute, because defrosting was confined to the dwell period of the molds, and because of inefficient heat transfer effects from simple immersion in the defrost pot.

Under the present invention, the defrost pot is eliminated and replaced by continuously flowing, fixed spray defrost nozzles. The spray system includes paired headers that straddle the molds at the extraction station, each header having a row of nozzles that converge and spray opposite side faces of the molds. Streams of heated water are emitted from the nozzles continuously and hence initiate defrosting during pre-extraction indexing, as well as when the molds are stopped between the headers for extraction. In the embodiment of the invention illustrated (as in the aforesaid prior machines), the extractor bars are applied to the molds during the dwell period and as soon as the freeze-bond is released, the extractor bars are lifted to remove the frozen products from the molds.

Turning to the spray system itself, under the present invention it has been found that a properly directed spray will, when applied to molds that have been prewetted in the immersion tank, cause immediate formation of a film interface by capillarity around the molds, which provides optimum heat transfer.

Thus one of the features of the present invention is that the molds are indexed through the defrost streams while the molds are still wet from the brine in the freezing tank which brine adheres to the molds after removal thereof from the freezing tank. This prewetted surface of the mold facilitates the spread of spray stream liquid down and around the entire mold surface. It provides perfectly intimate contact between the spray liquid and the metal molds for most efficient heat transfer. Thus, a layer of liquid is immediately established over the molds when they are subjected to the defrost spray streams and once such a spray of liquid is established, the subsequently arriving or replenishing outer layers of the streams are readily diffused into the layers already on the molds. This supplies a continuous source of new, warmer liquid to the molds so that heat transfer within the heat transfer film of water at the mold surfaces can take place by mechanically induced convection, as well as by mere conduction and the relatively "mild" convection that result from simple immersion in a tank. This feature of the invention materially decreases the time required for defrost and hence increases the potential speed of operation (cycling) of the entire molding apparatus.

In molding machines of the present invention, transverse rows of molds are spaced along the conveyor chain, that is, there are open spaces between the tops of each row of molds. It is important that the spray streams of liquid do not attain trajectories high enough or cause splash effects to cause water to squirt up between the rows of molds, either during indexing or when the molds are stationary. If this happened, defrost water would fall down upon the product which is exposed at the upper ends of the molds. On the other hand, in order to obtain a maximum defrosting action from the available heat transfer effects of the defrost spray streams, it is desirable that the streams impinge upon the molds as close to their tops as possible. It is equally important that the height of the spray streams be "stable" during the entire operation thereof. In other words, the height reached by water from the spray stream should not be greatly increased or decreased when the molds approach, reach and leave their fixed or extraction positions. An undesired increase in trajectory height (assuming an optimum height trajectory) might cause liquid to work its way up between the molds and fall on the face of the products, as described above. On the other hand, although this danger could be obviated if the spray streams were given trajectories which cause them to impinge relatively low along the side faces of the molds, such as expedient would reduce the efficiency of the heat transfer operation and hence would not make it possible to obtain optimum machine speed.

A feature of the present invention that stable height sprays are obtained, thereby making it possible to place the upper limits of the stream trajectories near the tops of the molds. This is accomplished by so directing and pressurizing the spray streams that upper limits of their static trajectory heights, that is the height they attain in free space, are such that the spray streams just begin to turn or fall downwardly at the point where they strike the sides of the molds. With this construction, not only is the flow of defrost water established in a most effective manner along the sides of the molds but according to the principles outlined above, the downwardly flowing water from the spray streams does not interfere with the upwardly approaching water in the spray streams. Hence the spray streams will remain stable in height so long as the pressure to the headers and their nozzles is held constant. Of course, the maintenance of constant water pressure to the nozzles is readily accomplished by conventional hydraulic equipment, the details of which are not critical to the present invention.

Another feature of the present invention is that optimum heat transfer between the water and the spaced streams in the molds is attained without interference from the bottoms of the molds and while accommodating a range of mold lengths. This is accomplished by selecting the proper longitudinal spacing of the headers for the nozzles and by making those headers rotatable about their axes to a limited extent, for adjustment of the degree of angular convergence of the nozzles towards the molds.

In connection with the maintenance of the stable height streams from the nozzles referred to above, it has been found that in addition to the use of regulators for holding the water pressure constant, equal distribution of water under pressure to the nozzles is facilitated by employment of special baffles that run longitudinal of the nozzles and are apertured at selected zones along their length.

The manner in which these features of the invention are to be accomplished will be apparent from the detailed description of the preferred embodiment that follows.

BRIEF DESCRIPTION OF THE DRAWINGS

FIG. 1 is a diagram showing the delivery end of a freeze molding machine embodying the present invention.

FIGS. 2A–2D are schematic diagrams showing various steps in the defrost and extraction cycles.

FIG. 3 is a perspective view of the defrost system.

FIG. 4 is a transverse view of the system with parts broken away between the nozzle headers.

FIG. 5 is a side view of the nozzle assembly.

FIG. 6 is a transverse view of the nozzle assembly with parts broken away.

FIG. 7 is a plan view of the nozzle assembly with parts broken away.

FIG. 8 is an enlarged section through a header taken on line 8—8 of FIG. 6, with the header end plate omitted.

FIG. 9 is an enlarged side sectional view of the nozzle assembly illustrating the normal spray stream trajectory.

FIG. 10 is a still further enlarged view illustrating diagrammatically the action of the spray streams at the mold walls.

DETAILED DESCRIPTION

The spray defrost system D of the present invention will be described in conjunction with the freeze molding machine indicated generally at 10 in FIG. 1. The details of this machine are not critical to the present invention, and a machine of the type shown in FIG. 1 and described in detail in the aforesaid U.S. patent to Hirahara 3,403,639 to which reference is made for those details. As will be apparent, the spray system of the present invention is applicable to other freeze molding machines such as those of the patents referred to in the aforesaid Hirahara patent.

Referring to FIG. 1, transverse rows of molds M (see FIG. 3) are suspended from side chains 12 in a manner well known in this art. The chains are trained around indexing pulleys 14 at the delivery end of the machine and around idler pulleys (not shown) at the front end of the machine. The indexing mechanism for the chains and molds advances the chains by one mold row spacing. Thus the molds are immersed and progressed through cold brine 16 in the usual freezing tank 17, which causes the products 20 introduced into the molds by fillers (not shown), to freeze solid after insertion of sticks 22. The molds and their frozen products are, as shown in FIG. 1, emerge from the brine tank and are progressively indexed until they reach the defrost station apparatus D of the present invention.

At the defrost apparatus, sprays S of heated water converge upon both side faces of the transverse rows of molds. When the bonds between the frozen products 20 and the walls of the molds are released by heat exchange, the ascent of the defrost system extractor bars 24 lift the frozen products 20 from their molds by means of grasping the sticks 22 projecting up from the products. This extraction process is performed by an extractor mechanism indicated generally at 26 and described in detail in the aforesaid United States Hirahara patent. The frozen products 20, after having been extracted from the molds and lifted are advanced towards a bagging station (not shown) by means of an indexing overhead conveyor indicated generally at 30 in accordance with the aforesaid United States Hirahara patent.

FIGS. 2A to 2D illustrate critical steps in the defrosting-extraction cycle. In FIG. 2A, the rows have been indexed and are stationary to bring a mold M containing the frozen product between the defrost spray stream S. The mold M on the downstream side of the defrost station will have been emptied and the molds on the upstream side will contain frozen products. The outer faces of the molds M will still be wet from the brine 16 in the defrost tank 17. In FIG. 2A, the extractor bar 24 is shown poised above the mold M being defrosted. The sprays S originate from transversely extending headers 40, 42 which mount rows of converging nozzles 44. The sprays are directed against the sides of the molds (see FIG. 3) in accordance with principles to be described in more detail presently. The defrost water that falls down from the molds M drops into a drain tank 46 which is connected to a drain line 47 for disposal of the water in a manner not critical to the present invention.

In FIG. 2B the extractor bar 24 has descended over the mold product sticks 22 and claps 25 (FIG. 3) have gripped the stick in accordance with the principles well known in the art.

In FIG. 2C the extractor bar 24 has been raised by the rack and pinion extractor mechanism 26 (FIG. 1) thereby removing the product 20 from its mold M. Sufficient time will have elapsed for the defroster sprays of the present invention to remove the bond between the product 20 and the sidewalls of the molds.

In FIG. 2D the extracted product is about to be advanced by the overhead conveyor 30 (FIG. 1) and the mold chain has indexed another row spacing to bring a new mold M under spray streams. The spray streams operate continuously during the entire process and so the upstream row of molds passes through one of the spray streams during the indexing process after extraction from the adjacent downstream row of molds.

The preferred construction of the defrosting system D of the present invention appears in FIGS. 3–8. The nozzle headers 40, 42 are mounted between end plates 50 at opposite sides of the machine (FIGS. 6 and 7), only the near side end plates 50 appearing in FIGS. 3–5. The end plates 50 are supported on ears 52 which project up from cross brackets 54 that span the drain tanks 46 previously discussed. Each end plate has a dual manifold 56 welded thereto and formed with a depending nipple 58 to which a water inlet hose 60 is connected by a clamp or other means not shown of conventional construction. The bores 60 at opposite ends of the nozzle assembly are connected to a conventional regulated pressure water supply, not shown.

The end plates 50 are further supported by brackets 62 that depend from a side plate 64 of the apparatus (FIG. 4). The ends of the headers 40, 42 are undercut at 70 (see FIGS. 4, 6 and 7) that mount O-rings 72. The headers fit into recesses 74 formed in the end plates 50 and the plates 50 are clamped against the ends of the headers to make a watertight connection by means of a tie bolt 76 that extends between the headers 40, 42, as best shown in FIG. 7. With this construction, by loosening the tie bolt 76 the headers 40, 42 can be swiveled in the recesses 74 formed in the header plates to adjust the angle of convergence "a" at the nozzles 44 (see FIG. 9).

As to the nozzles 44, each header 40, 42 contains eight groups of four nozzles aligned with the corresponding row of eight molds M. In the embodiment shown these nozzles are formed of hexagonal stock drilled to provide a ⅛ inch diameter water passage. The inner ends of the nozzles are threaded at 45 (FIG. 8) so that they can be screwed into the header pipes 40, 42.

In order to assist in maintaining a static pressure along the lengths of the header pipes 40, 42 during the spraying operation, inverted U-shaped baffles 80 extend internally of the headers. These baffles have legs that straddle the inlet pipes 56 and are provided with equalizing ports 82 that are distributed along the baffles and are disposed intermediate each group of nozzles 44 (FIG. 6).

The geometry of the defrost system of the present system is illustrated in FIG. 9. With a given machine there will be a fixed center-to-center mold spacing indicated at $c$ in the figure. Molds M come in a range of sizes and the longest mold is indicated at M in FIG. 9 and the smallest mold is indicated in broken lines at M'. The center-to-center width $w$ between the headers 40 and 42 is also indicated in FIG. 9, and this distance is correlated with the height $h$ between the top of the water in the headers 40, 42 and a point $p$ which represents the prolongation of the axis of nozzles 44. The dimensions are chosen so that the spray streams S do not strike the lower corners of molds M adjacent to that mold which straddles the headers and is being defrosted. The point $p$ is less than an inch below the tops of the molds and is about at the mold fill level.

As mentioned, the included angle of convergence of the nozzle axes is shown at $a$ in FIG. 9. Given a predetermined width $w$ between the header axes and a selected height $h$ above the water level in the heads 40, 42 to the intercept point $p$ on the sides of the molds, the angle $a$ is determined.

In the introductory remarks it was mentioned that a stable spray device is essential to prevent splashthrough of water onto the product 20 through the gaps between the molds M, while permitting the intercept point $p$ to be high enough on the molds so that the water reaches the molds in the zone of the fill level for the product 20. As illustrated in FIG. 10, this spray height stability is accomplished by selecting the convergence angle $a$ so that the trajectory angle of the spray (and the water pressure) are such that the water jets just begin to turn over and fall as they reach the sides of the molds. With this construction, although the intercept height at point $p$ is relatively high on the mold walls, the returning water does not fall back on itself but flows smoothly down along the sides of the molds. Thus, no self-interference is generated within the spray streams at the point of intersection of the sprays with the molds.

FIG. 10 illustrates, in exaggerated thickness, a thin film of brine $f$ that remains on the molds from their immersion in the brine tank. As previously explained, when the sprays S impinge upon the mold walls, this film of water $f$ causes, due to capillarity effects, immediate spreading of the water on the sprays down and around and over the entire mold surfaces. Thus effective heat exchange begins at once and the colder films of water at the interface between the spray water and the mold spaces are constantly replaced by forced or mechanical convection which accelerates the heat exchange process. This represents a more efficient heat exchange operation than simple immersion in relatively static water of the tipped pots or tanks characteristic of prior commercial machines.

In a typical example, the depths of the molds can vary from 3¼ to 6⅝ inches and they will be at a row spacing $c$ (FIG. 9) of about 2 inches.

The height $h$ of the axis intercept $p$ above the water level in the headers 40, 42, will be in the order of 9 inches and the width $w$ between the axes of the headers 40, 42 will be 3 5/16 inches. The included angle of convergence $a$ between the spray axes will be about 12 degrees (6° per nozzle). This example provides the considerations outlined above in the commonly employed commercial machine of the type described in the United States Hirahara patent and will make possible the cycling of the molds and extraction of the frozen product therefrom at the rate of about 25 cycles per minute as compared with 18 cycles per minute in prior machines using the defrost pot system. The water temperature for the spray system need not be at the relatively high temperature of 140° or the like previously employed or defrosting pots but can be of a lower temperature, namely 70–90° F., which represents further economies in the operating costs of the system. The static water pressure in the headers 40, 42 will be adjusted to produce the spray height illustrated in FIGS. 9 and 10, this being a routine matter of regulator adjustment that can be performed after the insulation has been made.

Although the best mode contemplated for carrying out the present invention has been herein shown and described, it will be apparent that modification and variation may be made without departing from what is regarded to be the subject matter of the invention.

I claim:

1. Mold defrosting apparatus for elongate molds comprising a depending mold assembly; spaced, parallel elongate headers, means for mounting said headers beneath and straddling said molds, a row of nozzles projecting upwardly from each header, the two rows of nozzles converging to direct water against the sides of a mold disposed above and between the headers, and means for supplying water under pressure to said headers.

2. The apparatus of claim 1, wherein the convergence angle of said nozzles and the pressure of the water supply are such that the streams of water emitted from said nozzle reach the upper limits of their trajectory and begin to fall down when they impinge upon said molds.

3. The apparatus of claim 1, wherein said header mounting includes means for accommodating partial rotation of the headers with a resultant change in the angle of convergence of the nozzles.

4. The apparatus of claim 1, wherein a baffle runs along a mid-zone of each header, and longitudinally spaced water passages are formed along said baffle.

5. The apparatus of claim 4, wherein said baffle has an inverted U-shaped cross section and the water passages are disposed in parallel rows.

6. The apparatus of claim 5, wherein the spacing of said baffle water passages exceeds the spacing of the nozzles along their headers.

7. Apparatus for molding frozen food products or the like, comprising means for advancing depending mold assemblies along a path, said mold assemblies extending laterally across the path and being closely spaced along the path, means for thawing the molds comprising spaced but parallel headers beneath said molds, means for stopping each mold assembly so that it is straddled by the headers, nozzles projecting upwardly from each header and converging against opposite sides of each stationary mold assembly, the spacing of said headers and the angle of convergence of their nozzles being such that water streams having the nozzles just clear the lower corners of mold assemblies at each side of said one mold, and means for supplying water under sufficient pressure to said headers to cause the streams of water emitted from said nozzles to reach the upper limits of their trajectories and begin to fall down before impinging on the molds.

8. The apparatus of claim 7, wherein said water supplying means operates continuously for spraying the molds both during their advance and when they are stopped.

9. Apparatus for forming molded food products or the like of the type wherein filled molds are advanced through a freezing liquid, the molds are removed from the liquid, upwardly directed mold thawing spray means are provided and the frozen products extracted from molds; the improvement wherein said mold thawing spray means comprises parallel rows of upwardly directed converging nozzles disposed beneath the molds, means for continuously supplying heated water under pressure to said nozzles, and means for temporarily stopping the molds so that the streams of heated water from said nozzles strike the opposite side faces of molds for releasing the frozen product, said streams being inclined from the vertical toward the molds and being directed to impinge upon the upper portions of the molds, the pressure of said water supply means being such that the streams have reached the upper limits of their trajectories and have just started to fall when they impinge upon the molds.

10. The apparatus of claim 9, wherein the included angle of nozzle convergence is about 10° to 20°.

11. The method of forming molded frozen food products or the like comprising the steps of advancing filled, open top molds of generally rectangular section through a product freezing liquid, removing the molds from the freezing liquid, advancing the molds flatwise and while still wet through upwardly directed, converging streams of heated water, stopping the molds between said streams so that said streams impinge upon upper portions of opposed side faces of the molds, said streams of water having reached the upper limits of their trajectories and having just started to fall when they impinge upon the molds, holding the molds in said streams until the frozen products are released from their molds, extracting the products thus released from their molds, and advancing the emptied molds out of said streams of water.

References Cited
UNITED STATES PATENTS

| | | | |
|---|---|---|---|
| 2,247,865 | 7/1941 | Zarotschenzeff et al. | 62—64 |
| 2,614,403 | 10/1952 | Heise | 62—375 |
| 2,685,177 | 8/1954 | Wagner | 62—345 |
| 3,488,976 | 1/1970 | Hirahara et al. | 62—345 X |
| 3,535,889 | 10/1970 | Curti | 62—322 |

JAMES R. BOLER, Primary Examiner

U.S. Cl. X.R.

62—322, 345, 380; 425—436, 117